United States Patent
Arellano et al.

(10) Patent No.: US 7,621,591 B2
(45) Date of Patent: Nov. 24, 2009

(54) ATTACHMENT STRUCTURE FOR MOTOR VEHICLE HEADLINER

(75) Inventors: Nora Arellano, Ann Arbor, MI (US); Mohammed Alawadi, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 34 days.

(21) Appl. No.: 11/956,786

(22) Filed: Dec. 14, 2007

(65) Prior Publication Data

US 2009/0152904 A1 Jun. 18, 2009

(51) Int. Cl.
*B60R 13/02* (2006.01)
(52) U.S. Cl. .................................. 296/214; 296/216.07
(58) Field of Classification Search ............ 296/216.06, 296/216.07, 216.8, 214
See application file for complete search history.

(56) References Cited

U.S. PATENT DOCUMENTS

| | | | |
|---|---|---|---|
| 5,992,914 A | 11/1999 | Gotoh et al. | |
| 6,457,738 B1 | 10/2002 | Labrie et al. | |
| 6,983,984 B2 | 1/2006 | Garceau | |
| 2002/0142129 A1* | 10/2002 | Chaudhry | ................... 428/131 |
| 2007/0046073 A1 | 3/2007 | Ludwig et al. | |
| 2008/0258507 A1* | 10/2008 | Dykman et al. | ........ 296/216.07 |

* cited by examiner

*Primary Examiner*—Dennis H Pedder
*Assistant Examiner*—Pinel E Romain
(74) *Attorney, Agent, or Firm*—Gifford, Krass, Sprinkle, Anderson & Citkowski, P.C.

(57) ABSTRACT

A headliner assembly covers an inner surface of a motor vehicle roof having a sunroof opening. The headliner assembly includes a dimensionally stable substrate having an upper surface facing the inner surface of the motor vehicle roof and an opposite bottom surface. The headliner assembly also includes a molded reinforcement disposed along the upper surface of the substrate. The molded reinforcement has a main wall and a box-shaped attachment structure supporting a fastener for attaching the headliner assembly to the inner surface of the motor vehicle roof. The attachment structure has spaced apart pair of side walls extending between the main wall and the inner surface of the motor vehicle roof. The attachment structure has a top wall extending between tie side walls of the attachment structure. The attachment structure also includes a reinforcing wall extending between the top wall and the side walls. The reinforcing wall contacts the substrate to control the distance between the substrate and the molded reinforcement.

13 Claims, 4 Drawing Sheets

ATTACHMENT STRUCTURE FOR MOTOR VEHICLE HEADLINER

FIELD OF TIE INVENTION

The invention relates to headliners for motor vehicles. More particularly, the invention relates to an attachment structure for attaching headliners to motor vehicle roofs.

BACKGROUND OF THE INVENTION

Motor vehicles commonly include sunroof openings formed in the roof. Motor vehicles also typically include a headliner for covering the inside surfaces of the roof. A headliner for vehicles with a sunroof will include an opening allowing access to the sunroof from inside of the vehicle.

It remains desirable to provide an improved attachment structure for fixing the headliner to the vehicle roof. It remains further desirable to provide an improved attachment structure that secures the headliner along the edges of the sunroof opening where gaps may form and be easily seen.

SUMMARY OF THE INVENTION

According to one aspect of the invention, a headliner assembly is provided for covering an inner surface of a motor vehicle roof. The headliner assembly includes a plurality of fasteners for attaching the headliner assembly to the inner surface of the motor vehicle roof. The headliner assembly includes a dimensionally stable substrate having an upper surface facing the inner surface of the motor vehicle roof and an opposite bottom surface. The headliner assembly also includes a molded reinforcement disposed along the upper surface of the substrate. The molded reinforcement has a main wall. The molded reinforcement also has a plurality of box-shaped attachment structures each supporting one of the plurality of fasteners. The attachment structure has a spaced apart pair of side walls extending between the main wall and the inner surface of the motor vehicle roof. The attachment structure has a top wall extending between the side walls of the attachment structure. The attachment structure also includes a reinforcing wall extending between the top wall and the side walls.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
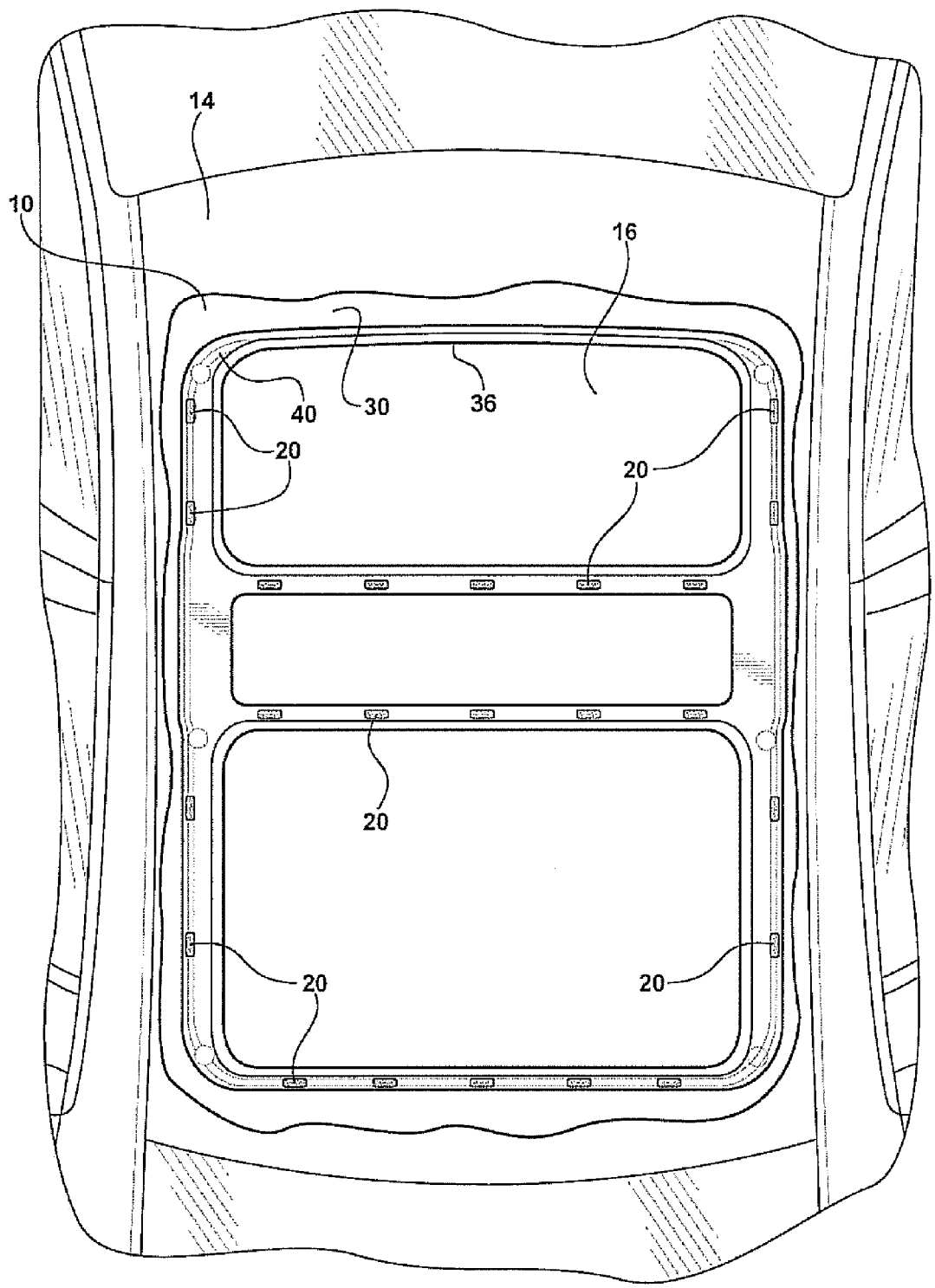
FIG. 1 is a bottom view of a motor vehicle roof and a headliner assembly covering the motor vehicle roof.
Figure 2:
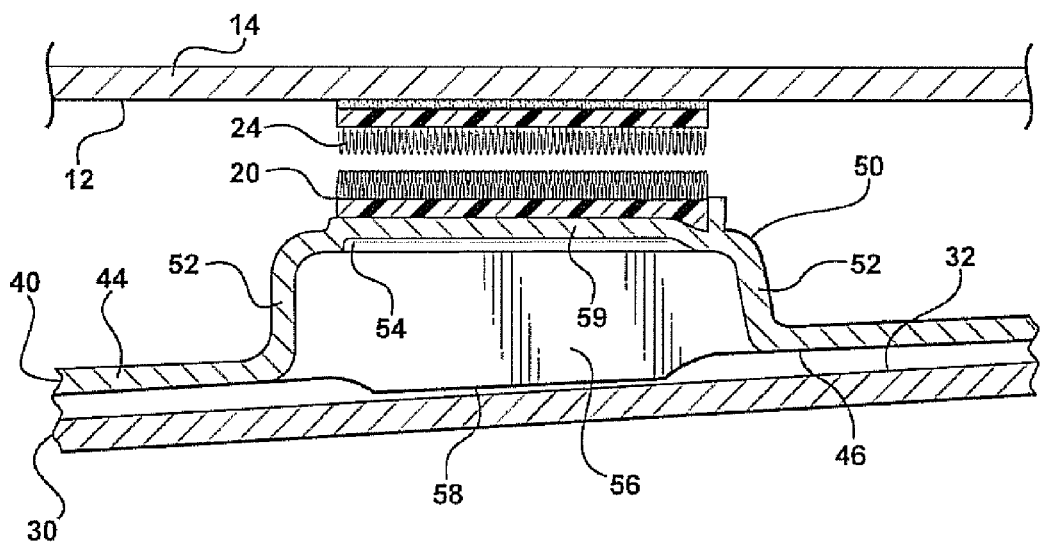
FIG. 2 is a cross sectional view of the headliner assembly as taken through the plane indicated at 2-2 in FIG. 1.
Figure 4:
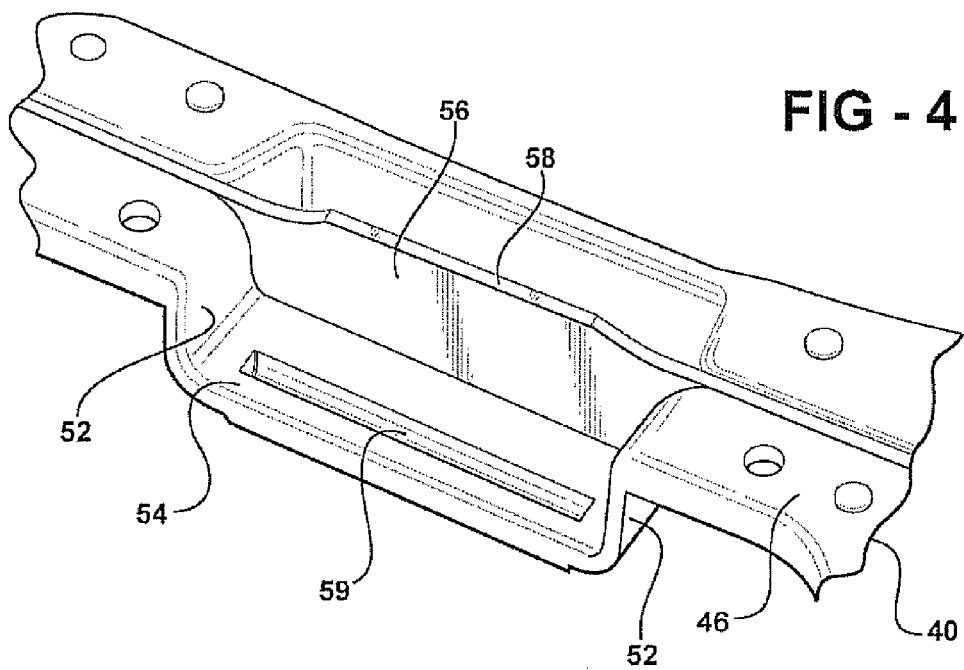
FIG. 4 is a bottom view of an attachment structure of a molded reinforcement of the headliner assembly.
Figure 3:
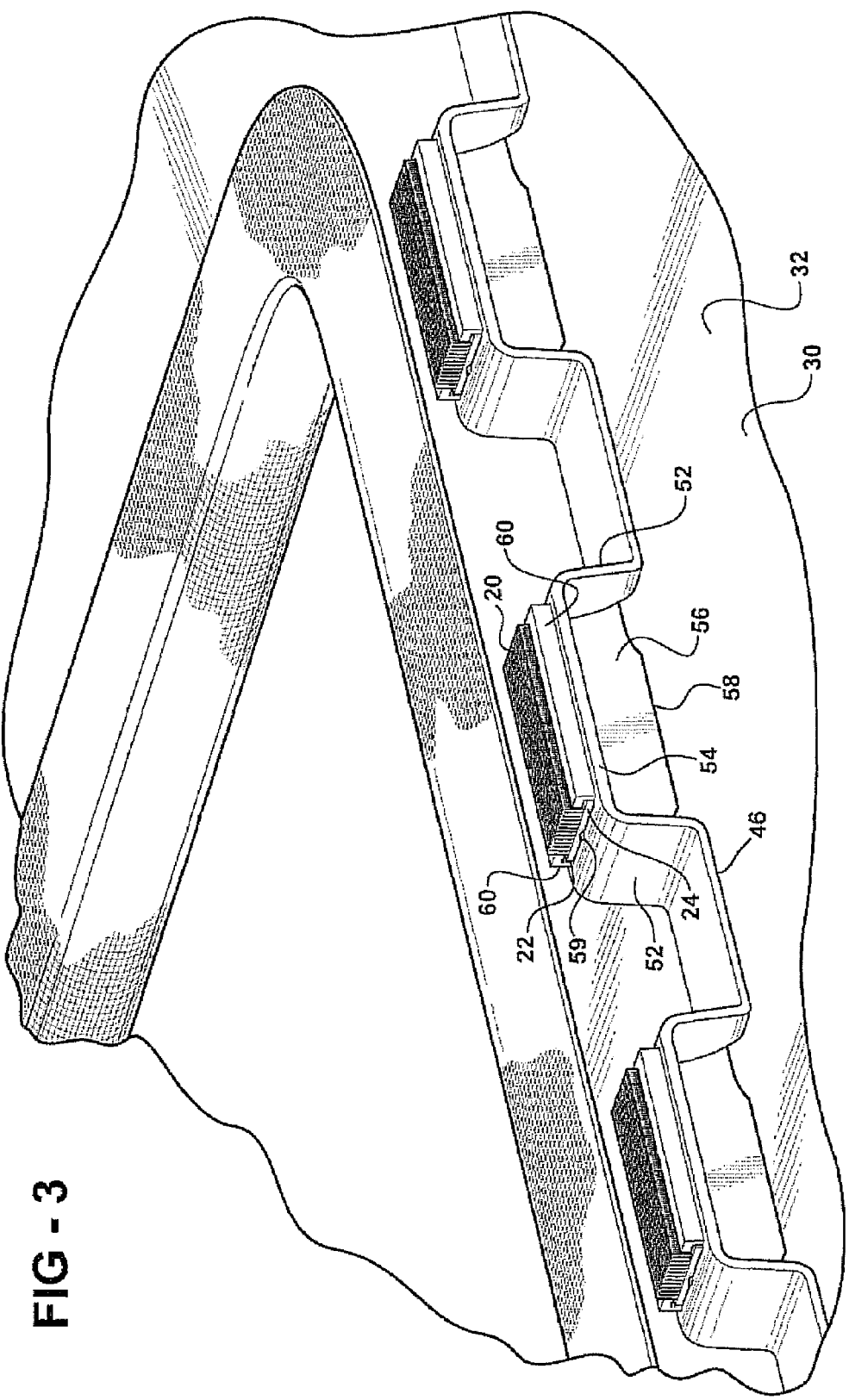
FIG. 3 is a top perspective view of the headliner assembly.
Figure 5:
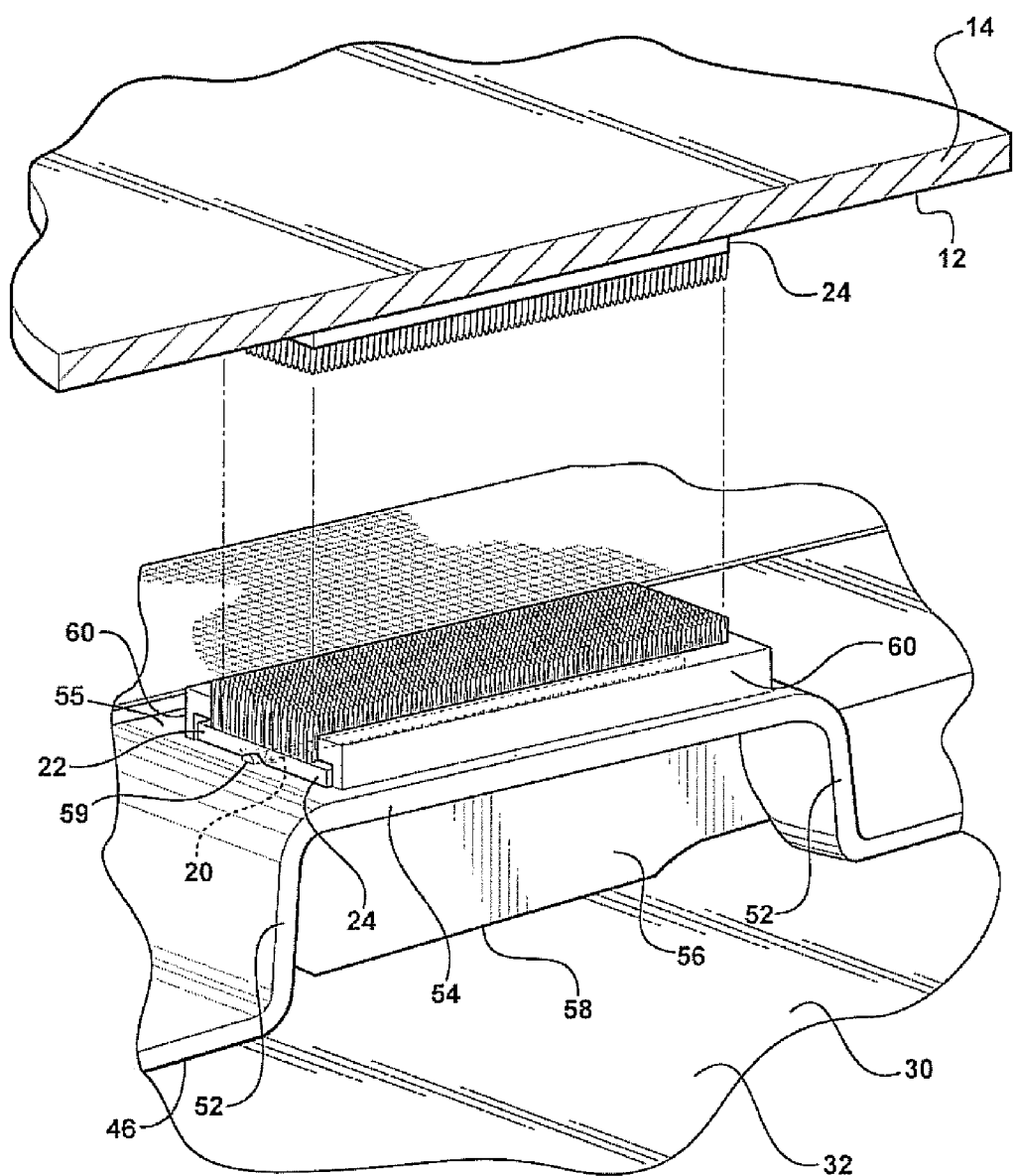
FIG. 5 is an exploded top perspective view of the headliner assembly and motor vehicle roof.

Referring to the figures, a headliner assembly 10 is shown for covering an inner surface 12 of a motor vehicle roof 14 having a sunroof opening 16. The headliner assembly 10 includes a fastener 20 for attaching the headliner assembly 10 to the inner surface 12 of the motor vehicle roof 14. The headliner assembly 10 includes a dimensionally stable substrate 30 having an upper surface 32 facing the inner surface 12 of the motor vehicle roof and an opposite bottom surface 34. The substrate 30 has a peripheral edge 36 extending along the sunroof opening 16. The headliner assembly 10 also includes a molded reinforcement 40 disposed along the upper surface 32 of the substrate 30. The reinforcement 40 extends along the peripheral edge 36 of the sunroof opening 16. The molded reinforcement 40 has a main wall 44 and a box-shaped attachment structure 50 supporting the fastener 20.

The attachment structure 50 has a spaced apart pair of side walls 52 extending between the main wall 44 and the inner surface 12 of the motor vehicle roof 14. The attachment structure 50 has a top wall 54 extending between the side walls 52 of the attachment structure 50. The attachment structure 50 also includes a reinforcing wall 56 extending between the top wall 54 and the side walls 52 for reinforcing the attachment structure 50.

The reinforcing wall 56 includes a bottom edge 58 spaced apart from the top wall 54. The bottom edge 58 is spaced below a bottom surface 46 of the molded reinforcement 40. The bottom edge 58 contacts an upper surface 32 of the substrate 30 to locate the substrate 30 relative to the bottom surface 46 of the reinforcement 40. This allows tie location of the substrate 30 relative to the inner surface 12 of the vehicle roof 14 to be controlled without adding height to the attachment structure 50 above the main wall 44 of the molded reinforcement 40.

The attachment structure 50 also includes retaining walls 60 disposed along a top surface 55 of the top wall 54 for holding the fastener 20. More specifically, the retaining walls 60 are generally inverted L-shaped and symmetrically opposite to each other to retain outwardly extending sides 22, 24 of the fastener 20. In one embodiment, the fastener 20 is one side of a hook and loop strip. The other side 24 of the hook and loop strip is fixedly secured to the inner surface 12 of the motor vehicle roof 14 by adhesives or other suitable fixing means known by those having ordinary skill in the art. The headliner 10 is coupled to the roof 14 by pressing the fastener 20 against the other side 24 of the hook and loop strip.

A rib 59 extends along the top surface 55 of the top wall 54. The rib 59 is disposed between and generally parallel with the retaining walls 60. The rib 59 tensions the fastener 20 against the retaining walls 60 to ensure retention of the fastener 20 along the top wall 54 of the attachment structure 50.

A plurality of attachment structures 50 are formed along the edges of the molded reinforcement 40 adjacent to the sunroof opening to minimize gaps and ensure a finished appearance between the headliner assembly 10 and the roof 14.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A headliner assembly for covering an inner surface of a motor vehicle roof, said headliner assembly comprising:
   a plurality of fasteners;
   a dimensionally stable substrate having an upper surface facing the inner surface of the motor vehicle roof and an opposite bottom surface; and
   a molded reinforcement fixedly secured to the substrate and having a main wall disposed along the upper surface of the substrate, the molded reinforcement having a plurality of generally box-shaped attachment structures each supporting one of the plurality of fasteners for attaching the headliner assembly to the inner surface of the motor vehicle roof, each attachment structure having:

a pair of side walls extending between the main wall and the inner surface of the motor vehicle roof;

a top wall extending between the side wails of the attachment structure; and a reinforcing wall extending from the top wall in a direction towards the substrate and traversing a space between the pair of side walls.

2. A headliner assembly as set forth in claim 1, wherein the reinforcing wall includes a bottom edge spaced apart from the top wall.

3. A headliner assembly as set forth in claim 2, wherein the bottom edge is spaced below a bottom surface of the molded reinforcement.

4. A headliner assembly as set forth in claim 3, wherein the bottom edge contacts an upper surface of the substrate to locate the substrate with respect to the lower surface of the molded reinforcement.

5. A headliner assembly as set forth in claim 4, wherein the fastener is one side of a hook and loop strip.

6. A headliner assembly as set forth in claim 5, wherein each attachment structure includes retaining walls extending upwardly from a top surface of the top wall for retaining the fastener along the top wall of the attachment structure.

7. A headliner assembly as set forth in claim 6, wherein the retaining walls are generally L-shaped and are substantially symmetrically opposite to each other for retaining the fastener along the top wall of the attachment structure.

8. A headliner assembly as set forth in claim 6, wherein each attachment structure includes a rib extending outwardly from the top surface of the top wall, the rib tensioning the fastener against the retaining walls to ensure retention of the fastener along the top wall of the attachment structure.

9. A headliner assembly as set forth in claim 8, wherein the rib is disposed between the retaining walls.

10. A headliner assembly as set forth in claim 9, wherein the rib is generally parallel with the retaining walls.

11. A headliner assembly as set forth in claim 1, wherein the side walls are generally parallel to each other.

12. A headliner assembly as set forth in claim 1, wherein the substrate has a peripheral edge extending along a sunroof opening formed in the motor vehicle roof 13. A headliner assembly as set forth in claim 12, wherein said plurality of generally box-shaped attachment structures are positioned along the peripheral edge of the substrate.

* * * * *

UNITED STATES PATENT AND TRADEMARK OFFICE
CERTIFICATE OF CORRECTION

PATENT NO. : 7,621,591 B2 Page 1 of 1
APPLICATION NO. : 11/956786
DATED : November 24, 2009
INVENTOR(S) : Arellano et al.

It is certified that error appears in the above-identified patent and that said Letters Patent is hereby corrected as shown below:

In the Abstract line 13 replace "tie" with --the--

Column 2, line 24 replace "tie" with --the--

Column 3, line 8 replace "wails" with --walls--

Signed and Sealed this

Sixteenth Day of March, 2010

David J. Kappos
*Director of the United States Patent and Trademark Office*